July 10, 1951  V. R. DESPARD  2,560,506
MOUNTING STRAP FOR INTERCHANGEABLE WIRING DEVICES
Filed June 18, 1948  2 Sheets-Sheet 1
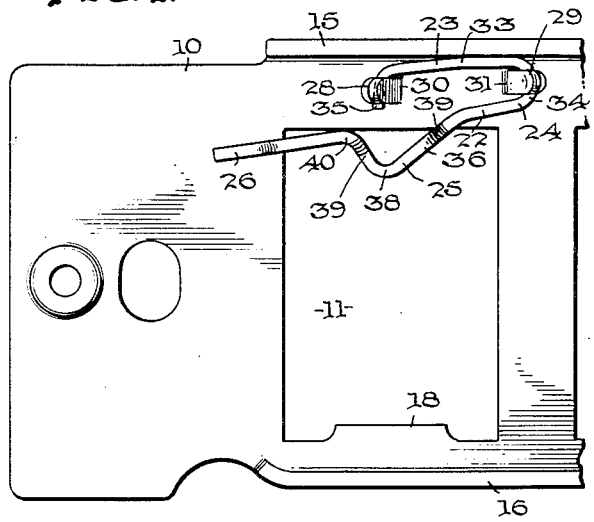
FIG. 1.
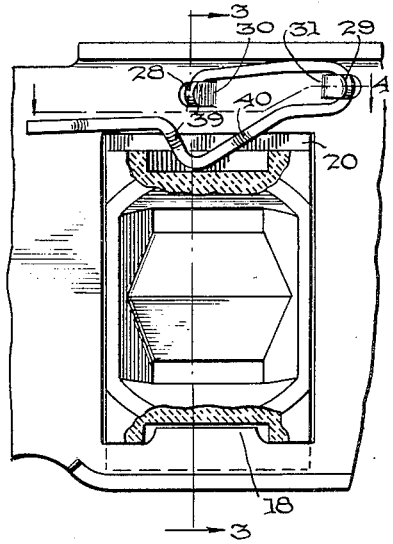
FIG. 2.
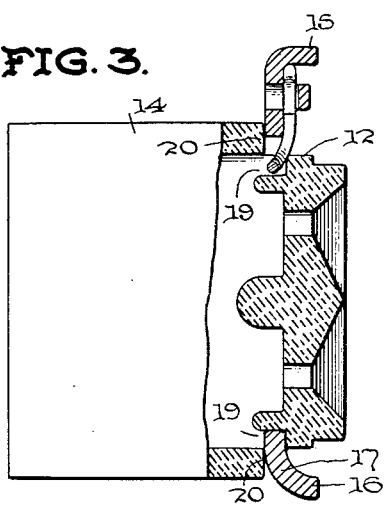
FIG. 3.
FIG. 4.
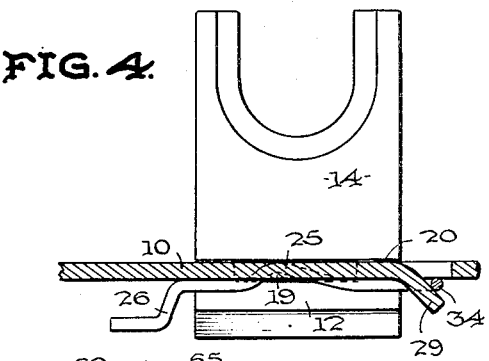
FIG. 6.
FIG. 5.
Inventor
VICTOR R. DESPARD
By Leech & Radue
Attorneys July 10, 1951 V. R. DESPARD 2,560,506
MOUNTING STRAP FOR INTERCHANGEABLE WIRING DEVICES
Filed June 18, 1948 2 Sheets—Sheet 2
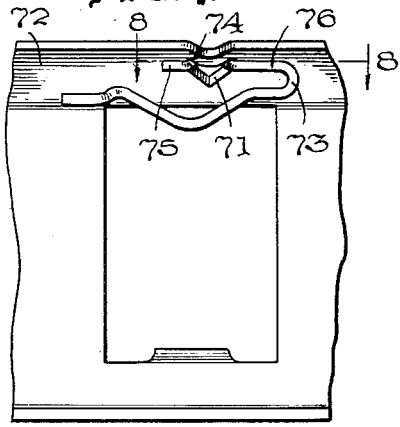
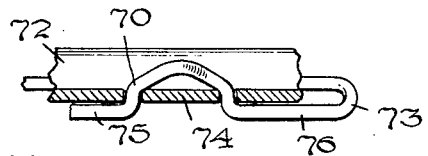
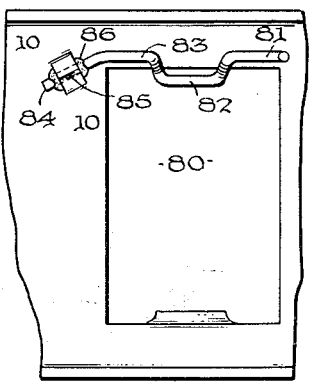
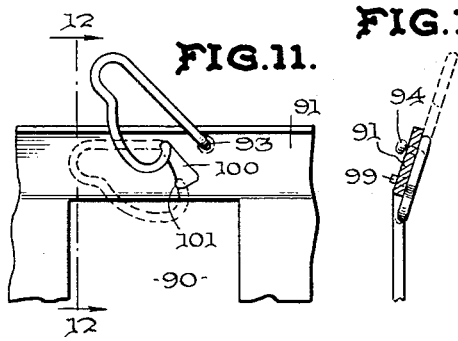
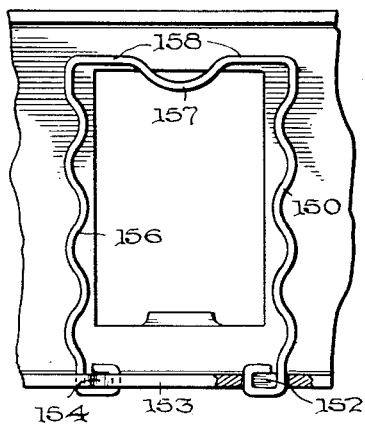
Inventor
VICTOR R. DESPARD
By Leech & Radue
Attorneys Patented July 10, 1951

2,560,506

UNITED STATES PATENT OFFICE 2,560,506

MOUNTING STRAP FOR INTERCHANGEABLE WIRING DEVICES

Victor R. Despard, Syracuse, N. Y., assignor to Pass & Seymour, Inc., Solvay Station, Syracuse, N. Y., a corporation of New York Application June 18, 1948, Serial No. 33,755

12 Claims. (Cl. 174—53)

This invention relates to mounting straps or bridge plates of the type adapted to span the front or open face of an outlet box and to receive and support therein one or more wiring devices of the interchangeable type, disclosed in general in reissue Patent No. Re. 19,092, granted February 20, 1934, to Victor R. Despard.

Improvements in the methods of and means for supporting the interchangeable wiring devices in the bridge or strap are disclosed in Despard Patent No. 1,992,059, granted February 19, 1934, and in the Despard and Russell Patent No. 2,248,201, granted July 8, 1941. The embodiments of the invention disclosed in these several patents have long been and are still on sale on a commercial scale by several large manufacturers and have achieved wide popularity for home and office wiring and similar uses.

The present invention contemplates improvements in the mounting strap or bridge plate to increase the facility with which wiring devices may be inserted therein or removed therefrom in assembling various combinations of the same for use as required.

In the constructions disclosed in the last two mentioned patents the means for engaging and securing the wiring device neck to the walls of its opening in the bridge plate are an integral part of the plate and require the use of a tool for forming or deflecting them into the recesses in the neck for receiving them. A tool is also required to remove a wiring device from the bridge and difficulty may be experienced in reusing the latter thereafter.

It is a general object of the present invention to provide novel and improved locking or securing means for fastening wiring devices in their openings in mounting straps without the use of tools.

More particularly it is an object of the invention to provide bridge plates or mounting straps in which one side of each opening is fitted with fixed means to retain one side of the wiring device neck and in which the other side is equipped with a manually operable locking means which can be engaged with the neck or withdrawn without the use of any tools.

An important feature of some of the embodiments of the invention comprises the use of a spring locking wire permanently attached to the metal of the bridge, provided with a wedging bight for engaging in a neck recess of the wiring device and having a finger piece for withdrawal thereof when necessary.

Another important feature of this form of the invention resides in the disposition of the wedging bight whereby upon being engaged it moves over the edge of the opening in the mounting strap and projects down into the plane of the strap at an angle whereby the engagement with the neck recess of the wiring device draws the shoulder of the latter securely against the back face of the plate.

Other features of the embodiments using the spring wire locking means involve novel arrangements for attaching and mounting the wire on the bridge plate, which facilitates the assembly of the parts and insures rigid mounting.

Another feature of some embodiments involve the tilting or canting of the metal of the bridge adjacent the opening wall to insure projection of the wire element down into the opening better to engage the recess in the neck of the wiring device.

Other and further features and objects of the many embodiments of the invention will be clear to those skilled in the art from a consideration of the accompanying drawings and following specification, it being understood that such combinations and modifications of the embodiments illustrated may be made as fall within the scope of the appended claims without departing from the spirit of the invention.

In said drawings:

Fig. 1 is a front elevation of a fragment of a bridge plate or mounting strap constructed in accordance with a simple form of the present invention and intended to accommodate from one to three wiring devices disposed transversely thereof;

Fig. 2 is a view similar to Fig. 1 but showing a wiring device secured in position on the strap and illustrated partly broken away to better depict the mounting action;

Fig. 3 is a transverse section taken centrally through the device of Fig. 2 on lines 3—3 thereof;

Fig. 4 is a longitudinal section taken on line 4—4 of Fig. 2;

Fig. 5 is a fragmentary front elevation of a locking means similar to that of Fig. 1 but applied to a strap in which a single wiring device extends longitudinally;

Fig. 6 is a view similar to Fig. 1 but showing one edge flange in horizontal section to illustrate a modified locking wire attaching means;

Fig. 7 is a face view of a preferred embodiment;

Fig. 8 is a longitudinal section take on line 8—8 of Fig. 7;

Fig. 9 is a view similar to Fig. 1 but showing a still further embodiment;

Fig. 10 is a fragmentary section on line 10—10 of Fig. 9;

Fig. 11 is a view similar to Fig. 1 showing a further embodiment using a pivoted locking wire to provide both camming and wedging;

Fig. 12 is a transverse section taken on line 12—12 of Fig. 11;

Fig. 13 is a perspective view of the pivoted wire of Fig. 11; and

Fig. 14 is a view similar to Fig. 1 but showing a tensioned wire type of securing means.

The first forms of the invention involve fixed spring locking devices such as illustrated in Figs. 1 to 9, inclusive; the preferred form is illustrated in Figs. 7 and 8 with minor variations, particularly involving the manner of attaching the locking spring to the bridge plate, illustrated in Figs. 1 to 7, inclusive.

The bridge plate or mounting strip 10 of these figures is generally of the type illustrated in Figs. 1, 2 and 3 of Russell and Despard Patent No. 2,248,201, granted July 8, 1941. Each plate as seen in Figs. 1 and 2 is provided with from one to three substantially rectangular openings 11 each adapted to accommodate with only minimum or manufacturing tolerance the rectangular neck 12 of a wiring device 14. In the embodiment of Figs. 1 to 4 the rectangular openings 11 are arranged with their major axes transverse to the longitudinal axis of the bridge. The bridge is reinforced by having its longitudinal edges bent up at substantially right angles to provide narrow flanges 15 and 16, which not only afford greatly increased stiffness but provide extended surfaces against which the back face of the face or wall plate engages to give it added stiffness.

In accordance with the showing in Patent No. 2,248,201, the flange 16 may merge into the plane surface of the plate on a relatively large radius 17, seen in Fig. 3, to provide clearance beneath the plate close up to one wall of the opening 11 for aid in inserting the neck of the wiring device. The lug 18 forms a continuation of this curve 17 and extends but a short distance into the opening 11, from the center of the adjacent short wall thereof. It is inserted in recess 19 in the corresponding short wall of neck 12 of the wiring device when the same is presented at the proper angle into the opening. This includes having the shoulder 20 which is beneath the recess abutting curve 17 and the opposite end of the neck just ready to enter the opening. The wiring device is then rotated about the lug until shoulder 20 fully engages beneath the back face of the plate.

The corresponding recess 19 in the other short wall of the neck is now adapted and positioned to receive the locking device of the present invention. These recesses 19 in the neck walls are relatively short, in the direction of the neck length and have here a dimension not substantially greater than the thickness of the metal of the bridge plate. The lug 18 therefore has a relatively close fit in the recess and insures against any substantial movement of the wiring device in the plate. Furthermore the under surface of the upper wall of each recess is engaged by an inclined surface to improve the action of drawing the shoulder against the back of the plate.

For the purpose of locking the wiring device in the plate, a separate manually operable locking device 22 is provided, which takes the form of a suitably bent spring wire of a diameter somewhat less than the thickness of the bridge plate and adapted for mounting principally against the front face thereof. This wire is bent to the form shown in Figs. 1 and 2, and includes a fastening reach or mounting portion 23, a spring section 24, a wedging bight 25 and a finger piece 26 in the order named.

For attaching this to the plate a pair of tabs 28 and 29 are punched up therefrom so that their outer ends clear its upper surface by just slightly more than the diameter of the wire while their inner ends 30 and 31 remain attached to the plate and in the plane thereof. The fastening reach 23 of the locking wire is bent at 33 to provide a right hand portion which due to the position of tab 29 lies full against the flange 15. The return curve 34 of the wire bends around tab 29 to merge into the spring section. The portion of the wire to the left of bend 33 is provided with a terminal 35 bent almost at right angles and snapped beneath the tab 28, as shown. This tends to straighten the bent portion 33 and securely holds the reach 23 against the flange. The parts 34 and 35, being hooked beneath the tabs and wedged there by the shape of these members, insure against any rotation of the wire about the axis of the mounting reach and hold the spring portion 24 closely down against the face of the plate.

To form the wedge bight 25 the wire is deflected at a small angle from the line of the spring portion 24, which substantially parallels the reach 23, to provide the length 36 which projects over the edge 37 of the opening 11 and is then bent at right angles as to 38 to provide a stretch 39 connected by bend 40 to the finger piece 26, the end of which may be elevated above the surface of the plate for convenience in grasping, as seen in Fig. 4.

Fig. 3 as well as Fig. 4 illustrates the downward deflection given to the part 25, accomplished by bends 39 and 40 so that this part, constituting the wedge bight, is projected down into the plane of the opening 11, as clearly seen in Fig. 3, to pass beneath the inclined upper wall of recess 19 in the short wall of the neck of the wiring device. It wedges beneath that wall, as shown, to securely draw the shoulder 20 against the back face of the plate to solidly position the wiring device in the opening.

Naturally before making the connection just described the locking wire bight is withdrawn from the opening by engagement of the thumb or finger with the finger piece 26 until the neck has been positioned as shown in Fig. 3, when the wire is released so that the wedge portion passes over the edge of the opening and into the neck recess, forming the lock. The inclined wedge bight portion projects downwardly over the edge 37 of the opening and beneath the upper wall of the recess in the neck to produce the wedging action which gives the part its name.

When the wiring device is locked in position by the spring wire all parts of the wire except the wedge bight lie on the upper surface of the bridge plate to prevent rearward withdrawal of the wiring device. The wedge portion is therefore adequately supported due to its rigidity and its connection at both ends to supported portions of the wire. The wiring device is easily snapped in or out of the plate to provide a great time saving element for wiremen. The method of attaching the wire to the plate makes use of the already existing flange 15 and provides for attachment without the use of tools, for the tabs 28 and 29 are struck up at the time the plate is punched and do not need to be pressed down on to the wire, for the wire can be snapped in position with the use of a simple tool and remains firmly as placed thereafter.

In the embodiment illustrated in Fig. 5 the invention is applied to a bridge plate intended to hold a single wiring device whose long axis is coincident with that of the plate. Such plates 45 are relatively narrow and are reinforced by edge flanges 46. The permanent lug 47 extending into the opening 48 may have relief provided adjacent thereto, as seen in Fig. 5 of Patent 2,248,201, but preferably the same results are achieved by slightly inclining the lug downwardly, as indicated by the shading lines, so that its upper inner edge is depressed below the top surface of the bridge plate a few hundredths of an inch, thus facilitating its insertion into one recess in the wiring device neck prior to passing the other end of the neck through the opening. This form of lug is available for the other embodiments described herein if desired. The locking wire 49 is not substantially different from that disclosed in Figs. 1 and 2 except that the mounting reach thereof contains two straight aligned portions 50 and 51 and an intermediate offset portion 52. The straight portions 50 and 51 are received and clamped beneath tabs 54 and 55 which are pressed back toward the plate after the wire is in position. This requirement is essential for the embodiment illustrated, because of the absence of a flange alongside of the mounting reach to perform the holding function defined in connection with the first embodiment. The offset stretch 52 serves to prevent rotation of the wire about the aligned portions 50 and 51, and by engaging the tabs the offsets prevent lateral movement. If desired a portion 56 of the left side flange of the bridge may be cut away to provide clearance for the finger portion of the locking spring. This embodiment illustrates in addition to the inclined lug 47, which can be incorporated in other embodiments if desired, the complementary shaping of the opposite wall of the opening as illustrated by the notch 58. This permits the portions 59 at either side thereof to more closely engage the neck than does any part of the equivalent wall in the first embodiment, while the notch provides adequate clearance for the entrance of the wedging bight of the locking wire. The feature of cutting away the wall of the opening opposite the lug as shown at 58 may be applied to any of the embodiments of this invention.

In Fig. 6 is shown a modification of the device of Figs. 1 and 2 in which the edge flange 60 at the near side of the plate is used for mounting the locking wire. In this case the wire is shaped substantially as in Fig. 5, except that the offset portion 61 between the straight portions 62 and 63 is directed toward the bight portion of the spring instead of away from it. To accommodate this arrangement the wall of the flange 60 is provided with three perforations 64, 65 and 66, through which the wire is threaded as shown. A large drop of solder 67 encircles the portion 61 of the wire, those portions passing through holes 64 and 65 and the surrounding areas of flange to insure a rigid mounting. If desired the holes 64 and 65 can be merged into a slot to facilitate the initial mounting of the wire.

A further modification of the form shown in Figs. 1 and 2 is illustrated in the preferred Figs. 7 and 8, where a wire of somewhat similar shape to that described in connection with Fig. 5 has its offset intermediate mounting portion 70 passed outwardly through an initially triangular opening in the inclined bridge flange 72 while the short bend 73 remains entirely on the inner side of the flange. After the wire is positioned as shown with the wedging offset portion 70 in opening 71 the narrow strip 74 bordering opening 71 is deformed to the position shown best in Fig. 7. This squeezes the inclined reaches of the offset portion of the wire into the corners of the opening and draws the straight portions 75 and 76 of the wire on each side of the offset tightly down against the flange 72. Thus the wire is rigidly held against movement in any direction and the spring reach containing the wedging bight is held down against the surface of the flange 72 which is so inclined as to project the bight at an angle into the slot in the neck of the wiring device.

Figs. 9 and 10 show a still simpler mounting for the locking wire, which in this case is applied to a bridge having transverse openings 80. No use is made of the flanges strengthening the bridge but the locking wire is simplified in form by having only a finger piece 81, a wedging U-portion 82, a spring portion 83, and a deflected mounting portion 84, which latter passes under a loop 85 struck up from the plate and is secured thereto and to the surrounding plate areas by a drop of solder 86. By deflecting the portion 84 out of alignment with 83 the effect of a pure rotational strain about the wire axis is relieved from the solder and a certain amount of the torque of the action of the wedge 82 is taken by the surface of the plate. Fig. 10 shows the struck up loop, both ends of which are integral with the plate.

In Figs. 11, 12 and 13 is illustrated a locking wire arranged to have both a camming and a wedging action. This is here shown mounted adjacent the short side of an opening 90 which extends transversely of the plate. Instead of having the edge flange formed at a right angle, however, this plate has a peripheral strip 91 just slightly bent up out of the plane of the bridge, providing both the required rigidity and the inclination, shown in Fig. 12, for directing the wedging and camming element down into the opening where it will be received beneath the upper wall of the neck recess.

The locking wire in this construction is shown in perspective in Fig. 13 and includes a pivot portion 92 which passes through a hole 93 in the flange 91 and is headed over as at 94 to hold it in position. A long straight reach 95 extending at right angles to the pivot portion 92 is intended when in locking position, to lie over the surface of the bent-up strip 91, as seen in dotted lines in Fig. 11. The free end of this is bent into a return loop 96 from which the combined wedge bight and cam portion 97 extends, terminated by a bend 98 and a short portion 99 parallelling 92.

This portion 99 is received in a slot 100 in strip 91, the upper end of which serves to limit the outward rotation of the locking wire to hold the solid line position shown in Fig. 11. The main portion of the slot 100 is substantially arcuate about the center 93, but the lower left hand corner is sharply notched as shown at 101. Normally the parts 92 and 93 of the spring wire are spaced apart wider than the distance from 92 to the arc 100 and are sprung into the position shown when the wire is mounted. Therefore when the whole wire is swung to the dotted line position the part 99 snaps down in the notch 101 and locks the wire against rotation in the holding position shown, where its wedging and camming portion 97 projects into the opening to be received in the recess in the wiring device neck.

In Fig. 14 is shown a further type of locking wire, where resilience of the wire alone is relied upon for providing the necessary movement for the locking portion and the subsequent holding of the wiring device in position. It is shown as applied to a mounting bridge having transverse openings. Each opening is similar to any of those previously described and three sides of it are surrounded by the locking wire 150, which takes the form of a large, three sided loop longer and wider than the opening. Each of the two terminal ends of the loop is formed into an eye which passes through an elongated opening or slot 152 in the flange 153 on the edge of the plate. The metal of the flange above the slot is then struck down into the eye as at 154 to secure it in position. Obviously other suitable fastening arrangements such as suggested in earlier embodiments may be substituted for that shown.

The side reaches of the wire extending away from the anchor points are corrugated or undulating, as seen at 156, to provide for stretching or expansion as necessary to withdraw the wedging bight 157 to clear the opening for the insertion of the neck of the wiring device. This wedging bight is bent toward the opening from two straight reaches 158 connecting it to the side reaches. The operation of inserting the neck can be effected by merely pressing it in place, which will cause a lifting of the wedging bight section of the wire, which can then be pressed downwardly and outwardly over the neck to snap into its recess, providing a locking wedge which remains in position until removed by a suitable tool. As in the first embodiment, both sides of the wedging bight, which is turned downwardly as that in the first embodiment, are supported by the surface of the mounting bridge to insure a firm adjustment of the wiring device in the mounting bridge All of the embodiments defined have in common a simplification of the mounting of wiring devices in their bridges and each includes a permanent lug for supporting one end of the neck by engaging in its recess and is provided with a manually operable locking or wedging means for engaging the opposite recess in the neck and simultaneously drawing the shoulder of the wiring device against the back face of the bridge to insure rigid and effective mounting of the same. All of the devices are operable without the need for any tools and thus greatly facilitate the mounting of wiring devices and reduce the time and labor involved. Furthermore, in the event that wrong elements are inadvertently positioned in the mounting bridge, they can be quickly removed and replaced, and this can be done as often as desired without any tendency toward deforming or breaking the mounting elements so as to prevent their reuse.

I claim:

1. In an electric wiring apparatus, in combination, a bridge plate for mounting over an outlet box and having an opening with opposite straight walls, a wiring device adapted for support by said plate and having a shoulder to fit against the plate back adjacent said walls, a neck protruding from said shoulder to extend through said opening and having only tolerance clearance from said walls, a recess in each neck side adjacent said walls and extending along the neck from the shoulder a distance not substantially greater than the thickness of said plate, one of said walls having a permanent lug thereon for extension into one of said recesses, and a spring element secured to said plate and having a bight biased over and beyond said other wall to engage in the opposite recess.

2. Electric wiring apparatus as defined in claim 1 in which the spring element is secured to the plate beyond one side of the bight and is fitted with a finger piece at the other side for retraction.

3. In an electric wiring apparatus, in combination, a metal bridge plate for mounting on an outlet and having an opening with opposite parallel walls, a wiring device having a shoulder to bear against the back of the plate, a neck extending from said shoulder to protrude through said opening and having only tolerance clearance from said walls, a recess in each neck side adjacent said walls and extending along the neck from the shoulder a distance not substantially greater than the thickness of said plate, one of said walls having fixed means to retain one side of said neck, and a locking element secured to the plate and having a wedging portion movable over the front face of the plate into the recess in the other side of the neck.

4. The electric wiring apparatus as defined in claim 3 in which the metal of the plate is inclined forwardly from the second side of the opening to project the said wedging portion into the plane of the opening edges.

5. In an electric wiring apparatus, in combination, a bridge plate for mounting on an outlet box and having an opening with opposite walls parallel with the major axis of the plate, a wiring device having a shoulder to bear against the back of the plate, a neck extending from said shoulder to pass through said opening and having only tolerance clearance from said walls, a recess in each neck side adjacent said walls and extending along the neck from the shoulder a distance not substantially greater than the thickness of said plate, one of said walls having a lug thereon for extension into one of said recesses, a locking element secured to the plate and having an arched portion movable across the opposite wall into the other recess, the edge portions of said plate adjacent to said walls being bent to provide stiffening flanges, the flange opposite the lug side being formed to cooperate with the locking element to assist in positioning the same to move into and cooperate with said neck recess.

6. For use with electric wiring apparatus, a bridge plate for mounting on an outlet box and having an opening with opposite walls to receive the neck of a wiring device, one of said walls having a lug projecting slightly into the opening and deflected toward the back of the plate a distance less than plate thickness, a portion of the plate adjacent the opposite wall having an incline directed toward the opening, and wedging means secured to said plate and movable over said incline and the opposite wall to project into the plane of said opening.

7. For use with electric wiring apparatus, a bridge plate for mounting on an outlet box and having an opening with opposite walls to receive the neck of a wiring device, one of said walls having a lug projecting slightly into the opening and deflected toward the back of the plate a distance less than plate thickness, a portion of the plate adjacent the opposite wall being relieved for a space less than the length of said wall, locking means for the said neck comprising a bent spring wire having a wedging element movable into said opening through the said relieved space, said element having a portion beyond the wedge bearing on the front face of the plate and one end of the wire being fixed to the plate.

8. For use with electric wiring apparatus, a bridge plate for mounting on an outlet box and having a generally rectangular opening to receive the neck of a wiring device, a pair of opposite walls defining the ends of said opening, one of said walls having a centrally disposed lug projecting slightly into the opening, a neck locking device mounted adjacent to the opposite wall and comprising a spring wire bent to form a mounting portion, a spring section, a wedge bight and a finger piece arranged in the order named, and means securing the mounting portion to the bridge plate in a position to project the wedge bight over said opposite wall into the plane of said opening.

9. A bridge member for a wiring device which is equipped with a neck protruding from a shoulder and adapted to be received closely in a generally rectangular opening of said bridge with the shoulder abutting the bridge back, flanges bent up from the long edges of the bridge, a pair of opposite walls defining the ends of said opening, one of said walls having a centrally disposed lug projecting slightly into said opening to engage in a recess in said neck, a neck locking device mounted adjacent the opposite wall and comprising a spring wire bent to form a mounting portion, a spring section, a wedge bight and a finger piece arranged in the order named, and means including one of said flanges positioning the mounting portion on said bridge in a position to resiliently project the wedge bight over said opposite wall and into said opening.

10. The bridge member as defined in claim 9 in which the means positioning the spring wire is a pair of tabs struck up from the bridge and cooperating with the flange to hold the wire snapped in position.

11. The bridge member as defined in claim 9 in which the said flange is perforated for the passage of two reaches of said mounting portion of the spring wire therethrough.

12. The bridge member as defined in claim 9 in which the said flange is perforated to accommodate two reaches of said mounting portion of the spring wire and is compressed thereon to clamp the wire in position.

VICTOR R. DESPARD.

REFERENCES CITED

The following references are of record in the file of this patent:

UNITED STATES PATENTS

| Number | Name | Date |
|---|---|---|
| Re. 19,092 | Despard | Feb. 20, 1934 |
| 554,051 | Butler | Feb. 4, 1896 |
| 1,692,029 | Epstein et al. | Nov. 20, 1928 |
| 2,092,904 | Brugger | Sept. 14, 1937 |
| 2,160,713 | Bentley | May 30, 1939 |
| 2,248,201 | Russell | July 8, 1941 |
| 2,325,621 | Miller | Aug. 3, 1943 |